E. C. MARTIN.
BLOWPIPE.
APPLICATION FILED DEC. 18, 1919.
1,412,211.
Patented Apr. 11, 1922.
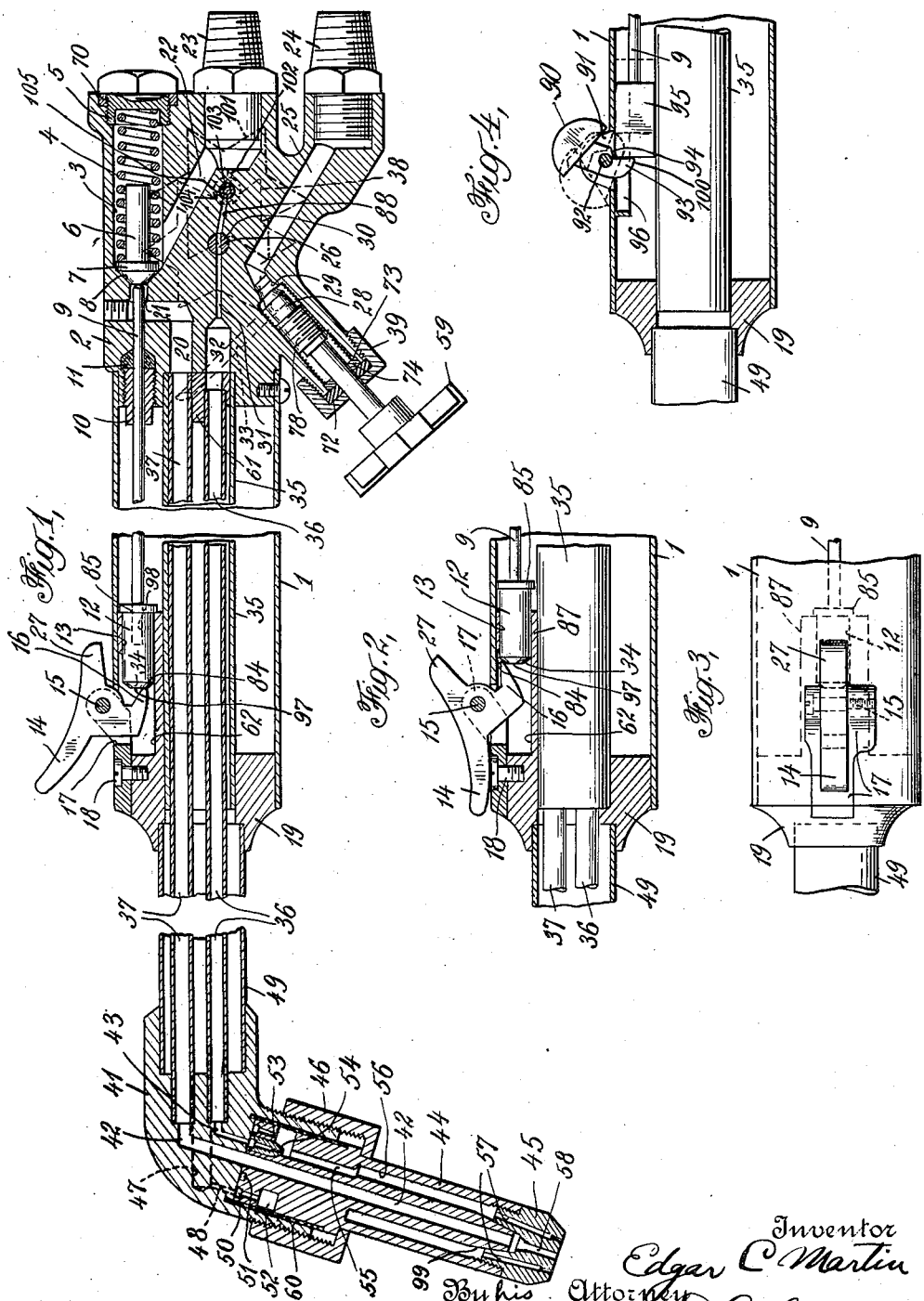

UNITED STATES PATENT OFFICE.

EDGAR C. MARTIN, OF CENTRAL, SOUTH CAROLINA, ASSIGNOR, BY MESNE ASSIGNMENTS, TO CARBIC MANUFACTURING COMPANY, OF DULUTH, MINNESOTA, A CORPORATION OF MINNESOTA.

BLOWPIPE.

1,412,211.　　　　Specification of Letters Patent.　　Patented Apr. 11, 1922.

Application filed December 18, 1919. Serial No. 345,691.

*To all whom it may concern:*

Be it known that I, EDGAR C. MARTIN, a citizen of the United States, and resident of Central, Pickens County, State of South Carolina, have made a certain new and useful Invention Relating to Blowpipes, of which the following is a specification, taken in connection with the accompanying drawing.
This invention relates especially to cutting blowpipes adapted for oxy-acetylene or similar metal cutting work. The blowpipe or torch is provided with a handle in connection with which an actuator is arranged preferably on a bracket having a pivot mounting outside the handle so that the actuator may have an oscillating movement enabling the connected cam member to operate an actuator rod so as to open the cooperating shut-off or cutting valve controlling the oxygen cutting jet. A regulating or adjusting valve is preferably provided to control the oxygen heating jet so as to make possible independent adjustment to suit various working conditions.

In the accompanying drawing showing in a somewhat diagrammatic way illustrative embodiments of this invention, Fig. 1 is a longitudinal vertical section through an illustrative blowpipe.

Fig. 2 is a partial sectional view showing the actuator in different position.

Fig. 3 is a corresponding partial top view; and Fig. 4 is a partial longitudinal section showing another form of actuator mechanism.

The blowpipe may be formed of any desired or suitable material and may comprise a tubular stem 49 of brass or other metal soldered or otherwise secured to the head 41 which may be of cast brass or the like and may support the cutting or welding tip in any desired way. If desired, the junction member or metallic ring 19 may be secured to the other end of the tubular stem 49 and may support the hollow handle 1 removably held in place as by suitable attaching screws indicated which may hold its rear portion upon the connector member 2 in which the adjusting and control valves may be arranged.

These valves may comprise the conical or needle adjusting valve 28 to control the acetylene or other heating gas applied to the passage 25 by the coupling 24. This valve may cooperate with a conical or other seat 29 and may be formed with an enlarged threaded body 78 engaging a threaded hole in the connector member so as to give a fine adjustment between this valve and its seat as the handle 59 is turned. A tight joint may be secured between this valve stem and the connector member by the use of a threaded packing gland 39 within which a compressible packing, such as 72, may be arranged between the gland or cap and the metallic packing washer 74 located in the annular recess 73 at the end of the threaded hole with which the valve body cooperates. The amount of acetylene or other heating gas supplied to the torch head may be accurately regulated in this way and as indicated this gas may pass through one or more passages 33 to any suitable conduit or channel such as the tube 35 mounted in the connector member and junction member 19 so as to deliver this heating gas to the tubular stem 49.

Oxygen may be supplied under pressure to a similar coupling 23 and passage 102 to the port 103 in a valve seat which may be formed in the member 2 with which may cooperate an adjusting or regulating valve having a conical tip 105 and generally corresponding to the adjusting valve 28 so that by turning the handle 101 of this valve and the corresponding stem 104, which are above the line of section, the flow of oxygen into the passage 88 may be adjusted. A manual shut-off valve for controlling this preheating oxygen may also advantageously be provided and may be in the form of a conical or plug valve 30 formed with the through valve port 26, so that the operation of the connected valve handle 38 of star or any other desired shape, may without interfering with the desired adjustment of the oxygen regulating valve quickly shut off this jet of preheating oxygen entering the passage 31, 32, and the communicating conduit 36. This conduit or tube may as indicated be mounted at its rear end in a plug or member 61 within the end of the pipe or tubular passage 35 while the other end of this conduit may be soldered or otherwise secured within the head 41 so as to communicate with the oxygen heating passage 43 therein leading to the detachable tip on the blowpipe. From the oxygen coupling

23 extends another oxygen passage 22 which may be controlled by a cutting or cut-off valve 6 which may be of generally conical form and held in place as by a spring 4 loosely arranged within the recess 3 in the connector member, the end of this recess being closed as by a screw cap 5 and packing 70. This spring normally tends to force the conical face 7 of this valve against the cooperating seat 8 so as to shut off the oxygen which for cutting purposes passes through the passages 21, 20 to the communicating conduit 37 mounted in the plug 61 at its rear end, and soldered or otherwise secured at its forward end within the head so as to deliver this cutting oxygen through the passage 42 communicating with the cutting passage in the detachable tip which may be centrally located therein as is indicated.

A desirable actuating device for operating this cutting valve may comprise an actuator rod 9 adapted to engage the valve to hold it in open position when desired and this actuating rod may extend through a packing 11 in the connector member which may be tightened from time to time by the packing plug 10 which may be given a polygonal projecting end for this purpose. The forward end of this actuating rod may be connected to or may cooperate with an actuator head or plug 12 which may have a socket 98 to accommodate the end of the rod. This actuator head 12 may be slidingly mounted within the recess 13 in the junction member so as to be controlled by an actuator, such as the cam member 16 preferably pivoted as by the pin 15 outside the handle and supported in an actuator bracket 17 which may be detachably secured to the junction member by the screw 18. In this way the actuator cam member may be oscillated by pressure on the forward portion 14 of the actuator which forces the contact end 84 of the cam member against the operating portion or face 97 of the actuator head which may have the enlarged flange 85 to limit its forward movement, so that the plug and actuator rod are forced backward by this cam action opening the cutting valve to the desired extent. It is desirable for some purposes to maintain the cutting valve in this open or operating position and for this purpose the actuator plug may advantageously be formed with one or more inclined or conical holding portions 34 so that when the actuator is pushed down into the position shown in Fig. 2 its contact end 84 rides up on this inclined or conical holding portion so as to be detachably retained in this position, although readily released therefrom by pressure on the rear end 27 of the actuator which causes a reverse oscillating movement of the actuator cam, so that the parts are promptly restored to their closed or shut-off position shown in Fig. 1 As shown in Fig. 3 the pivot 15 may be in the form of a screw detachably mounted in the actuator bracket 17 so that the actuator cam may be taken out for inspection or repairs if desired. Another form of actuator is shown in Fig. 4 as comprising a rounded hood or actuator member 90 pivoted about the pin 92 preferably detachably supported outside the handle 1 as by integral or other brackets or ears 91 so that the cam member 93 within the handle can have the desired engagement with the actuator plug or head 95 which may be secured to the actuator rod 9 and slidingly mounted within the handle. When this actuator 90 is pushed forward by the operator it forces the actuator plug or head backward thus opening the cutting valve through the actuator rod as before indicated while on release the actuator head 95 moves forward into the notch or recess 94 in this actuator cam. When the actuator 90 is pushed forward its cam portion 93 after forcing the actuator head backward may ride up past the end of this head so that the inclined or angularly arranged holding portion 100 which may be formed on this cam may so engage the upper portion of the head as to maintain or lock the parts in about this dotted line position, thus securely and definitely holding the cutting valve in open position as long as desired or until the parts are manually released by movement of the actuator in the opposite direction.

The removable tip 44 may be readily secured in position on the torch head as by forming a recess in the head in which the tip fits and into which it may be strongly forced by the securing collar 46 having an inwardly projecting flange engaging a flange on the tip. This tip may be formed with a central cutting passage 42 cooperating with the oxygen cutting passage in the head and annular recesses or channels may be formed in the meeting surfaces of the head or tip around this central passage to conduct the acetylene or other heating gas and the cooperating oxidizing gas for the heating jets from one to the other of these members. The annular recess 51 may be formed in position to communicate with the oxygen heating passage 43 in the head so as to supply the injector 54 located within the injector chamber in the tip which may be enclosed by separable casing or tube 60. The injector may thus deliver a heating jet of mixed gases into the mixing passage 55 communicating with the annular or other mixing chamber 56. The acetylene or other heating gas may be delivered into the channel 47 in the head from which one or more ports or passages 48 may lead into the annular recess 50 in the tip. This recess may communicate with the injector chamber 52 in the tip through a series of holes 53 so as to supply acetylene to this chamber and form the heating jet of mixed gases as described which may pass down the heating passages 57 in the tip end 45 which may be screwed on the tip and be provided with a cutting jet passage 58 as indicated. The tip may be formed around the central cutting passage 42 with a conically projecting lower portion 99 which may be tightly forced or screwed into a more or less conical socket in the tip end 45 so as to make a tight conical joint between these parts when the tip is assembled. This also facilitates forming the two or more converging heating conduits or passages 57, of which the larger portions that are adapted to communicate with the mixing chamber may be bored or formed from the upper end of this removable tip end before it is forced or screwed upon the main tip.

This invention has been described in connection with a number of illustrative parts, proportions, arrangements, materials, methods of manufacture, assembly and use, to the details of which disclosure the invention is not of course to be limited, since what is claimed as new and what is desired to be secured by Letters Patent is set forth in the appended claims.

1. The blowpipe comprising a head and connected tubular handle, a connector member secured to said handle, a cutting valve mounted in a recess in said connector member, a valve spring normally forcing said cutting valve shut, an actuator rod adapted to engage said cutting valve and open the same, an actuator head having sliding movement within said handle and formed with a socket to cooperate with said actuator rod, a removable actuator bracket secured to said handle and having a pivot outside said handle, an actuator oscillatingly mounted on said pivot and having a cam member projecting into said handle and engaging said actuator head, said actuator head having a relatively flat operating portion and an inclined holding portion to be engaged by the contact portion of said cam member when said cutting valve is open to hold the parts in such position.

2. The blowpipe comprising a head and connected tubular handle, a cutting valve, an actuator rod adapted to engage said cutting valve and open the same, an actuator head having sliding movement within said handle, an actuator oscillatingly mounted on said handle and having a cam member projecting into said handle and engaging said actuator head, said actuator head having an inclined holding portion to be engaged by the contact portion of said cam member when said cutting valve is open to hold the parts in such position.

3. The blowpipe comprising a tubular handle and a shut-off valve in the rear of said handle and actuating devices for said shut-off valve comprising an actuator head having sliding movement within said handle, a pivotally mounted actuator secured to said handle adjacent the front end thereof and having a cam member engaging said actuator head to operate the same and cooperating holding means on said head and cam member including an inclined conical portion on said head to releasably hold said shut-off valve in open position when said actuator has been operated.

4. The blowpipe comprising a tubular handle and a shut-off valve and actuating devices for said shut-off valve comprising an actuator head having movement within said handle, a pivotally mounted actuator secured to said handle and having a cam member engaging said actuator head to operate the same and cooperating holding means on said head and cam member including an inclined portion on said head to releasably hold said shut-off valve in open position when said actuator has been operated.

5. The blowpipe comprising a handle and a shut-off valve and actuating devices for said shut-off valve comprising an actuator member movably mounted with respect to said handle, a cooperating pivotally mounted actuator removably secured to said handle and having a cam member engaging said actuator member, the cooperating engaging surfaces of said actuator member and cam member including an inclined portion on said actuator member to releasably hold said shut-off valve in open position when said actuator has been operated.

6. The blowpipe comprising a head and connected tubular handle, a control valve, mounted at the rear of said handle, an actuator head operating said valve and having sliding movement within said handle, an arcuate actuator having its intermediate portion oscillatingly pivoted to said handle so that its concave side extends outward therefrom and having a cam member projecting into said handle and engaging said actuator head, said actuator head having an inclined holding portion to be engaged by the contact portion of said cam member when the forward end of said actuator is pushed in toward said handle so that said valve is held open and the parts are retained in such position and the rearward portion of said actuator projects outward from said handle to be engaged and actuated in shutting said valve.

7. The blowpipe comprising a head and connected tubular handle, a control valve mounted at the rear of said handle, an actuator head operating said valve and having sliding movement within said handle, an actuator oscillatingly pivoted to said handle so that its concave side extends outward therefrom and having a cam member projecting into said handle and engaging said actuator head, said actuator head having a holding portion to be engaged by the contact portion of said cam member when the forward end of said actuator is pushed in toward said handle so that said valve is held open and the parts are retained in such position.

8. The blowpipe comprising a head and connected tubular handle, a control valve, an actuator rod adapted to engage said valve and open the same, a connected actuator head having sliding movement within said handle, an arcuate actuator having its intermediate portion pivoted to said handle so that one of its ends extends outward therefrom and having an operating member projecting into said handle and engaging said actuator head, said actuator head having an inclined holding portion to be engaged by the contact portion of said operating member when one end of said actuator is pushed in toward said handle so that said valve is held open and the parts are retained in such position and the other end of said actuator projects outward from said handle to be engaged and actuated in shutting said valve.

9. The blowpipe comprising a head and connected tubular handle, a control valve, a connected actuator having its intermediate portion pivoted to said handle so that one of its ends extends outward therefrom and having on operating member projecting into said handle and to open said valve when one end of said actuator is pushed in toward said handle so that said valve is held open and the parts are retained in such position and the other end of said actuator projects outward from said handle to be engaged and actuated in shutting said valve.

EDGAR C. MARTIN.